United States Patent [19]
Kime et al.

[11] Patent Number: 5,893,961
[45] Date of Patent: Apr. 13, 1999

[54] BACKING RING CLAMPING SYSTEM

[75] Inventors: Geofrey Grant Kime, London; Michael Francis Regier, Exeter, both of Canada

[73] Assignee: Big "O" Inc., Exeter, Canada

[21] Appl. No.: 08/814,521

[22] Filed: Mar. 10, 1997

Related U.S. Application Data

[60] Continuation-in-part of application No. 08/451,805, May 26, 1995, Pat. No. 5,609,713, which is a division of application No. 08/179,292, Jan. 10, 1994, Pat. No. 5,441,588.

[51] Int. Cl.$^6$ ..................................................... B29C 65/20
[52] U.S. Cl. .................................. 156/304.2; 156/304.6; 156/499; 156/503
[58] Field of Search ......................... 156/304.2, 304.6, 156/309.9, 499, 503; 138/109; 285/903

[56] References Cited

U.S. PATENT DOCUMENTS

| 904,199 | 11/1908 | Harris | 285/903 |
|---|---|---|---|
| 3,426,841 | 2/1969 | Johnson | 156/304.2 |
| 4,726,866 | 2/1988 | Van Keimpema et al. | 156/304.2 |
| 5,053,097 | 10/1991 | Johansson et al. | 156/158 |
| 5,217,556 | 6/1993 | Fell | 156/292 |
| 5,320,697 | 6/1994 | Hegler et al. | 156/304.2 |
| 5,401,355 | 3/1995 | Stiller | 156/499 |
| 5,441,588 | 8/1995 | Kime et al. | 156/503 |
| 5,489,403 | 2/1996 | Hegler et al. | 156/304.2 |
| 5,609,713 | 3/1997 | Kime et al. | 156/304.2 |

FOREIGN PATENT DOCUMENTS

| 1-229616 | 9/1989 | Japan | 156/309.9 |

*Primary Examiner*—Steven D. Maki
*Attorney, Agent, or Firm*—Arne I. Fors

[57] ABSTRACT

A method and apparatus for fusing a bell connector to the end of a corrugated thermoplastic pipe are disclosed in which an expandable mandrel grips a preformed bell and a pipe support grips a pipe co-axial with the longitudinal axis of the bell. A pipe trimmer for facing the pipe end may be moved into and out of the axis of the pipe if necessary for trimming the pipe end to provide a uniform planar flange face and a heater, combined with a supporting flange, moved sequentially into and out of the axis of the pipe and bell for heating the opposed faces of the trimmed end of the pipe and the end of the bell to a desired fusing temperature. Upon heating of the opposed faces of the bell and the pipe to a predetermined fusing temperature, the said faces of the bell and the pipe are abutted against each other, with the back side of the corrugated pipe flange face fully supported by the supporting flange, i.e. backing ring, at a predetermined pressure for a time sufficient to fuse the bell and pipe together.

6 Claims, 10 Drawing Sheets

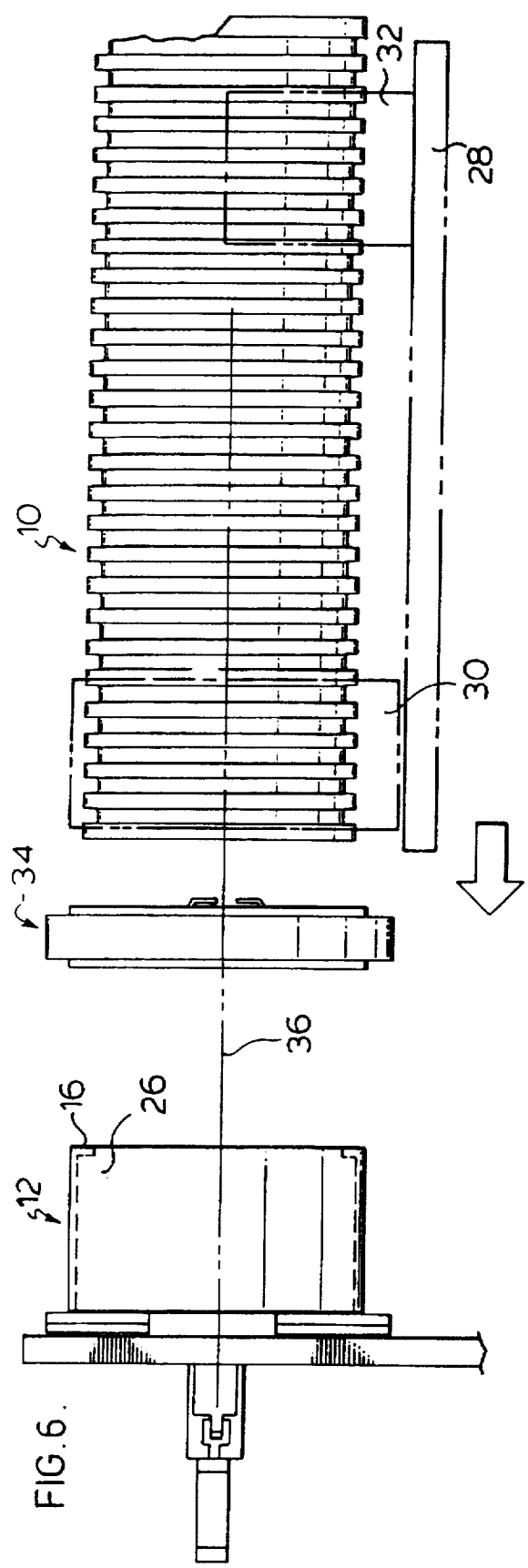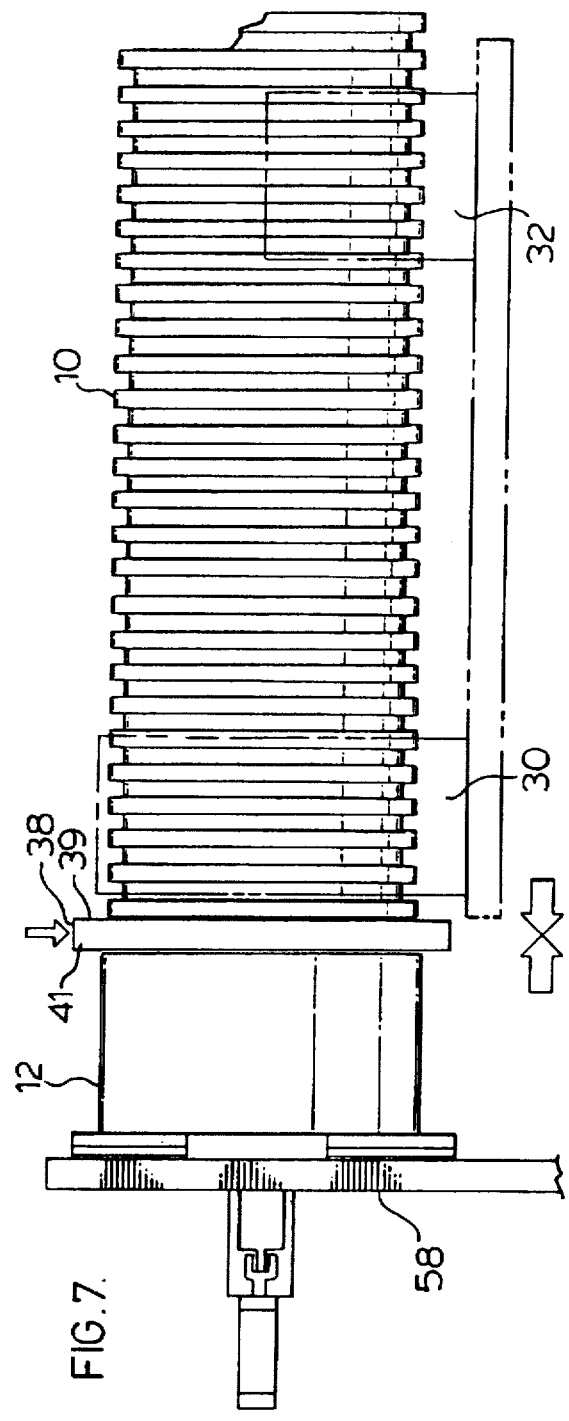
FIG. 6.
FIG. 7.

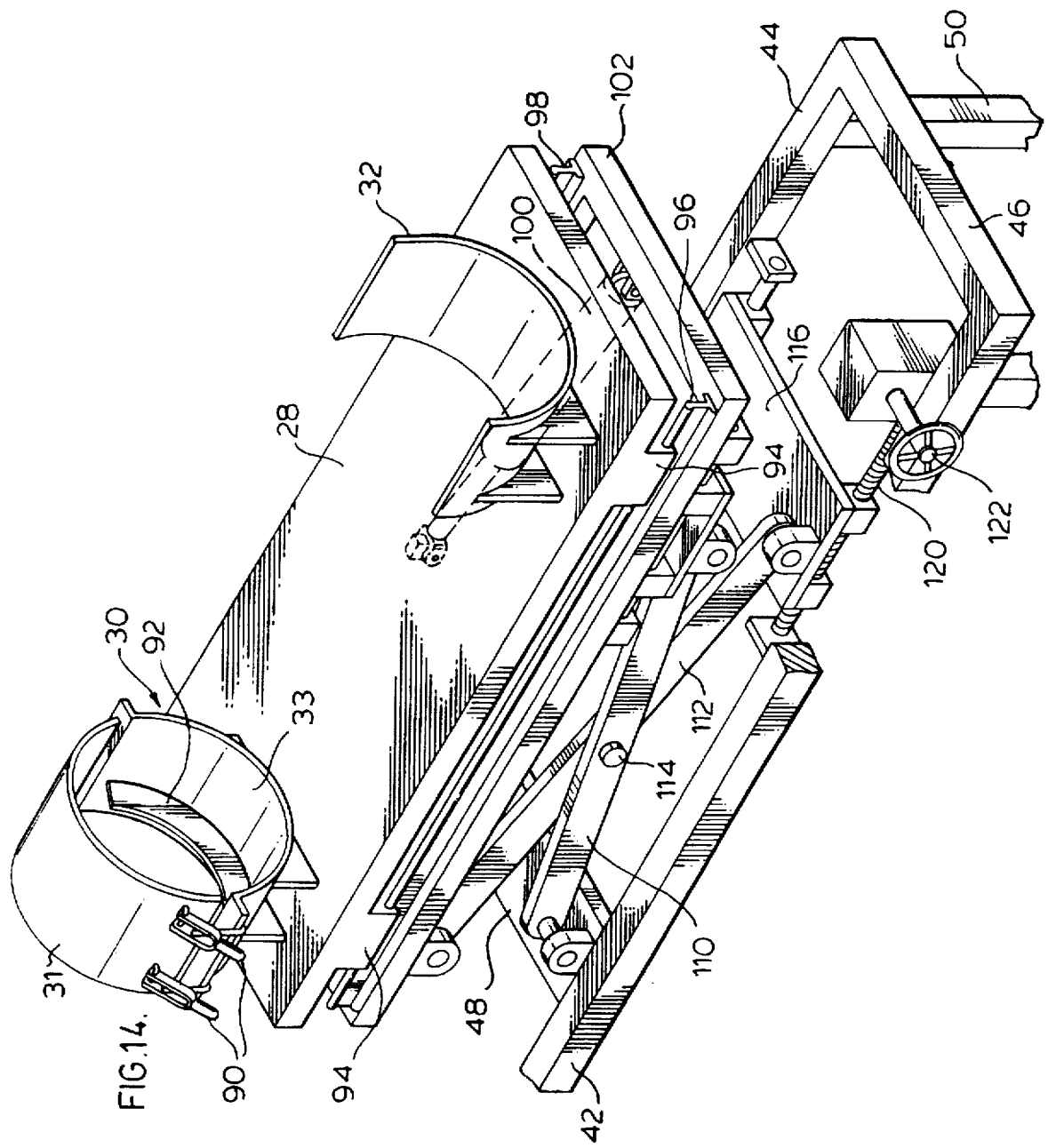

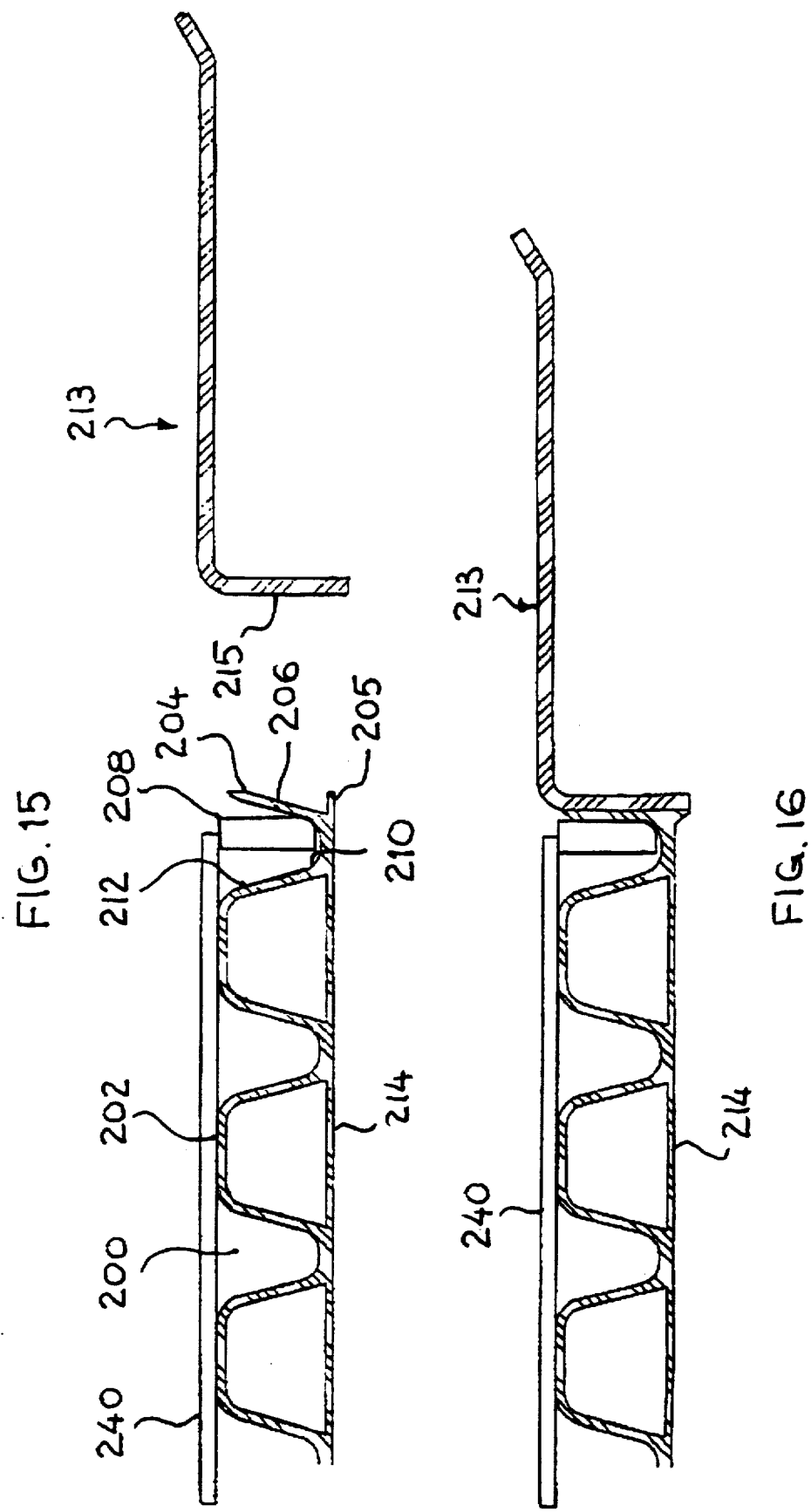

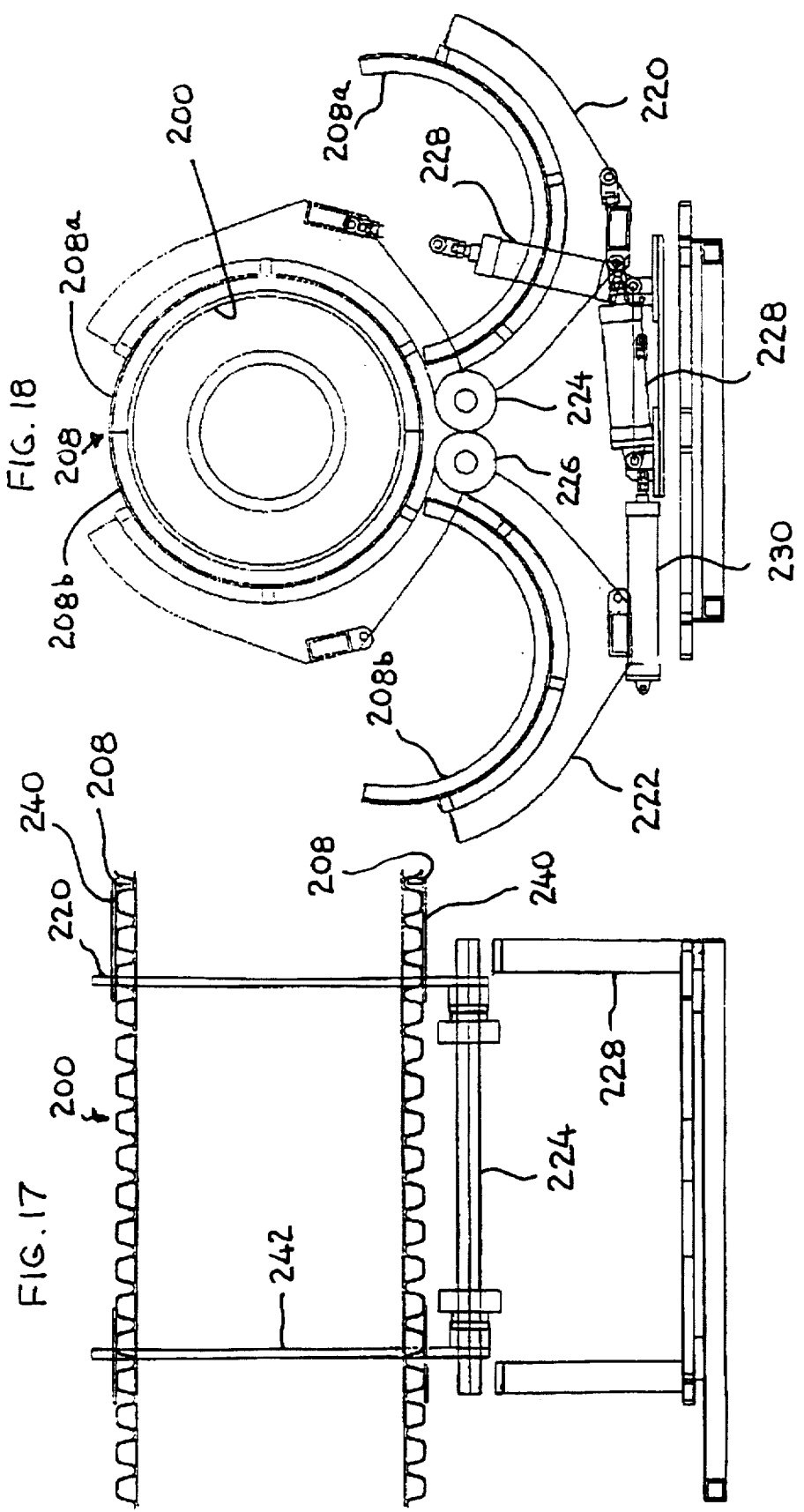

5,893,961

BACKING RING CLAMPING SYSTEM

This application is a continuation-in-part of application Ser. No. 08/451,805 filed May 26, 1995 and issued Mar. 11, 1997 as U.S. Pat. No. 5,609,713 which is a division of application Ser. No. 08/179,292, filed Jan. 10, 1994 and issued Aug. 15, 1995 as U.S. Pat. No. 5,441,588.

BACKGROUND OF THE INVENTION

This invention relates to the production of thermoplastic tubing and, more particularly, relates to a method and apparatus for fusing a bell connector onto a corrugated thermoplastic pipe.

Corrugated thermoplastic pipe such as that produced according to Patent Cooperation Treaty (PCT) Application Ser. No. PCT/CA 92/00422 filed Sep. 25, 1992 can be produced in any length, the length being determined by shipping limitations. Once at the installation site, lengths of pipe must be connected together axially.

Corrugated pipe of the type shown in the above-mentioned PCT application, particularly pipe of large diameter such as up to one meter in diameter, are difficult to interconnect with a structurally integral joint because of the size and shape of the pipe. There is thus a need for a reliable bell and spigot joint on thermoplastic pipe, particularly large diameter corrugated pipe, for facile assembly in the field.

Canadian Patent No. 144,585 discloses a method and apparatus for forming pipe couplings in which a bell or sleeve of a pipe coupling is formed at the end of a standard thermoplastic polyvinylchloride pipe. A tool is employed which comprises a mandrel having a diameter equal to the outer diameter of the pipe to be joined, of generally cylindrical configuration, with a forwardly and inwardly tapered leading end. The smaller diameter leading end forms a guide for a heated pipe as it is forced onto the mandrel and is subsequentially spread to the diameter of the mandrel. Further, apparatus is described to form a corrugation on the bell to provide a recess for an adhesive or other sealing means. The method and apparatus of this patent are limited to smooth wall pipe or tubing made of polyvinylchoride which have stability when heated and are not well suited for pipe or tubing made of polyolefins such as polyethylene and polypropylene which have poor thermal stability when heated to the fusion temperature.

A method for forming pipe couplings is described in U.S. Pat. No. 3,998,478 wherein a low cost gasket is provided at the joint coupling. The gasket has a simple sleeve-like internally ribbed form and essentially is self-holding and sealing in an annular space as defined between a plain spigot or male pipe end and a receiving bell or female formation of another element joined therewith. This gasket obviates the need for adhesive or solvent bonding of the pipe coupling. It is assumed in this disclosure that a sleeve or bell may be already present on the pipe end or may be readily formed thereon.

U.S. Pat. No. 3,841,668 discloses another pipe coupling assembly which provides a means to accommodate thermal expansion of the pipe. A transparent coupling welded or glued at one end to a first length of pipe has a seal ring in an annular groove in the other end of the coupling so that a second length of pipe can be inserted therein. The transparent coupling has indicia thereon to enable positioning of the second length of pipe at a proper location in accordance with the ambient temperature. Such a coupling may not work effectively on corrugated pipe since the sealing ring will not readily slip past each corrugation.

The fuse welding of pipe and tubing made of polyolefins is difficult to effect consistently because of the thermal instability of the material at fusion temperature, i.e. the inability of the polyolefins to maintain their shape when heated, and there is a need therefore to provide a method and apparatus for fusing a bell connector onto a thermoplastic pipe, particularly externally corrugated pipe having a smooth liner, made of polyolefins such as polyethylene and polypropylene. The bell connectors often are fuse welded to the front face of a corrugation. However, it has been found that the pipe corrugation may collapse when heated and joined to a bell under pressure.

SUMMARY OF THE INVENTION

In its broad aspect, the apparatus of the present invention for producing a bell joint on an end of thermoplastic corrugated pipe having a circumferential flange comprises a supporting framework, bell support means having a longitudinal axis disposed at an end of said supporting framework for gripping and supporting a bell concentric with said axis, means for extending and retracting the bell support means axially along said longitudinal axis, pipe securing means disposed at the opposite end of the supporting framework for gripping and supporting an end of a thermoplastic corrugated pipe, said pipe securing means including a circumferential backing plate for backing and supporting the pipe circumferential flange, means for raising and lowering at least one of said pipe securing means and said bell support mean on said supporting framework whereby a pipe supported thereby is co-axial with the said longitudinal axis, means for extending and retracting said pipe securing means axially towards and away from the bell support means, and heating means mounted on the supporting framework for movement into and out of the longitudinal axis for heating opposed faces of the end of the pipe and the end of the bell to a desired melting temperature, whereby upon heating of the opposed faces of the bell and the pipe annular flange to a desired melting temperature the bell support means and the pipe support means can be retracted to permit withdrawal of the heating means, and the said faces of the bell and the pipe annular flange supported by the circumferential flange can be immediately abutted against each other at a desired pressure by concurrent extension of at least one of the bell support means and pipe securing means for a time sufficient to fuse the bell and pipe together.

The bell support means preferably comprise a mandrel frame mounted on the supporting framework for reciprocal linear travel, piston and cylinder means connected to the supporting framework and to the mandrel frame for moving said mandrel frame linearly on the supporting frame, an expandable cylindrical mandrel mounted on the mandrel frame, said expandable cylindrical mandrel having a plurality of radially contractible or expansible segments, and means for contracting or expanding said mandrel segments. The plurality of mandrel segments are three segments disposed at about 120° about the mandrel, said means for contracting or expanding said mandrel segments comprise a radial slider connected to each mandrel segment mounted for inward and outward radial travel on the mandrel frame, a ring rotatably mounted on the mandrel frame and means for rotating said ring, said ring having a divergent slot formed at 120° thereabout corresponding to each radial slider, and a stud depending from each radial slider inserted into a corresponding divergent slot, whereby upon rotation of the ring the studs move the sliders and mandrel segments radially inwardly or outwardly. Said means for rotating the ring may comprise a piston and cylinder means interconnecting the ring to the mandrel frame.

The apparatus may additionally comprise an alignment guide having a conical frustum mounted for reciprocal linear axial travel within the mandrel, said conical frustum having a short cylindrical section having an outside diameter substantially equal to the inside diameter of the pipe, and means for retracting and extending said alignment guide from the mandrel, whereby the pipe is engaged by the alignment guide upon extension of the alignment guide from the mandrel into the pipe during fuse welding of the bell to the pipe.

The method of the invention for producing a bell joint on an end of thermoplastic polyolefin corrugated pipe having a smooth wall liner forming a dual wall thickness comprises, in its broad aspect, the steps of supporting a thermoplastic polyolefin bell having an inwardly facing circumferential flange concentric with bell support means having a longitudinal axis disposed at an end of a supporting framework for gripping and supporting said bell, securing a pipe on pipe support means disposed at the other end of the supporting framework for gripping and supporting an end of the pipe in proximity to the bell, raising and lowering said pipe on said supporting framework whereby said pipe is disposed co-axial with said longitudinal axis; trimming the end of the pipe secured on the pipe securing means to form a circumferential end flange from a corrugation substantially perpendicular to the longitudinal axis whereby said bell flange and said pipe flange have opposed annular faces, extending heating means operatively mounted on the supporting framework into and out of the longitudinal axis for heating opposed annular faces of the flange at the end of the pipe and the flange of the bell to a desired melting temperature, retracting the heating means, and immediately abutting the opposed heated faces of the bell flange and the pipe flange against each other at a desired pressure and completely supporting the pipe flange during heating and while under pressure with a backing plate for a time sufficient to fuse the bell flange and pipe flange together. Preferably the height of the face of the pipe circumferential flange is melted and the face of the bell circumferential flange is melted to a height of at least equal to the height of the pipe circumferential flange. The polyolefin may be polyethylene with a melting temperature about 233° C.

BRIEF DESCRIPTION OF THE DRAWINGS

The method and apparatus of the invention will now be described with reference to the accompanying drawings, in which:

FIG. 6 is a side elevation, partly diagrammatic, showing the pipe moving toward the cutting means to be trimmed;

FIG. 7 is a side elevation, partly diagrammatic, of the pipe and bell faces being heated by the heating means;

FIG. 14 is a perspective view of an embodiment of the pipe securing means showing the scissor-lift raising and lowering means;

FIG. 15 is a longitudinal section of a bell with flange and pipe with flange and backing plate prior to fuse welding;

FIG. 16 is a longitudinal section corresponding to FIG. 15 during fuse welding;

FIG. 17 is a side elevation of the clamping system embodiment with backing ring on a pipe; and FIG. 18 is a front elevation of the embodiment shown in FIG. 17 in an open position with closed position shown by ghost lines.

DESCRIPTION OF THE PREFERRED EMBODIMENTS

Figure 1:
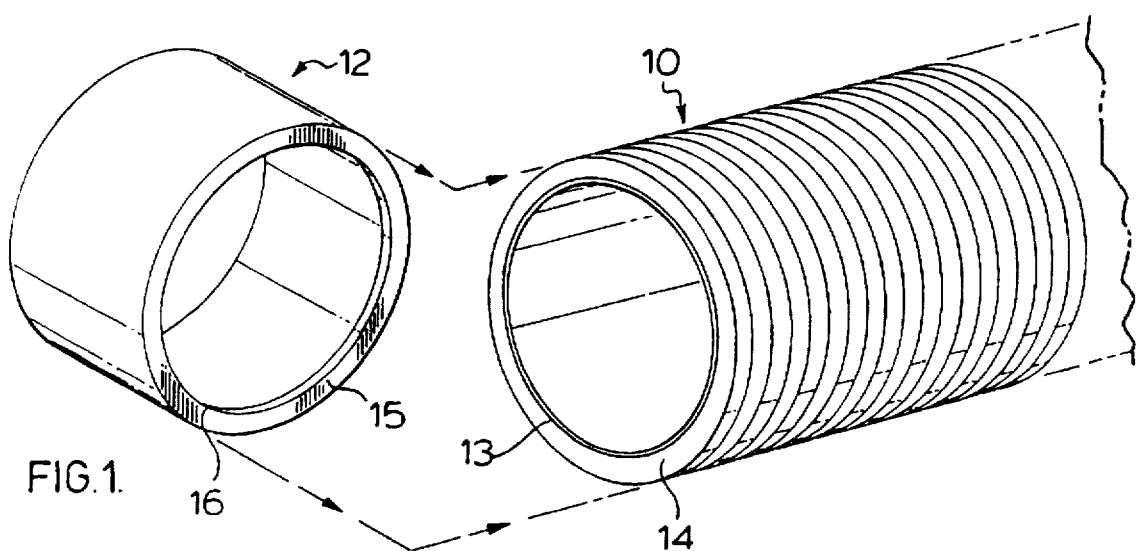
FIG. 1 is an exploded perspective view of a corrugated thermoplastic pipe with smooth-wall liner and a bell prior to assembly.
Figure 2:
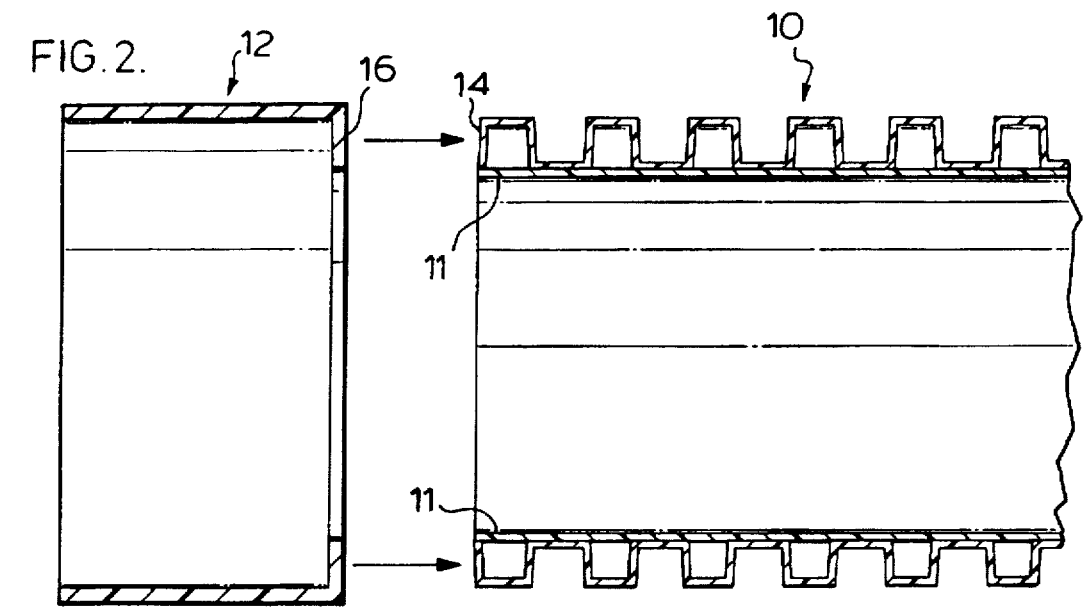
FIG. 2 is a cross section view of a pipe, partly cut away, and of a bell immediately prior to assembly.
Figure 3:
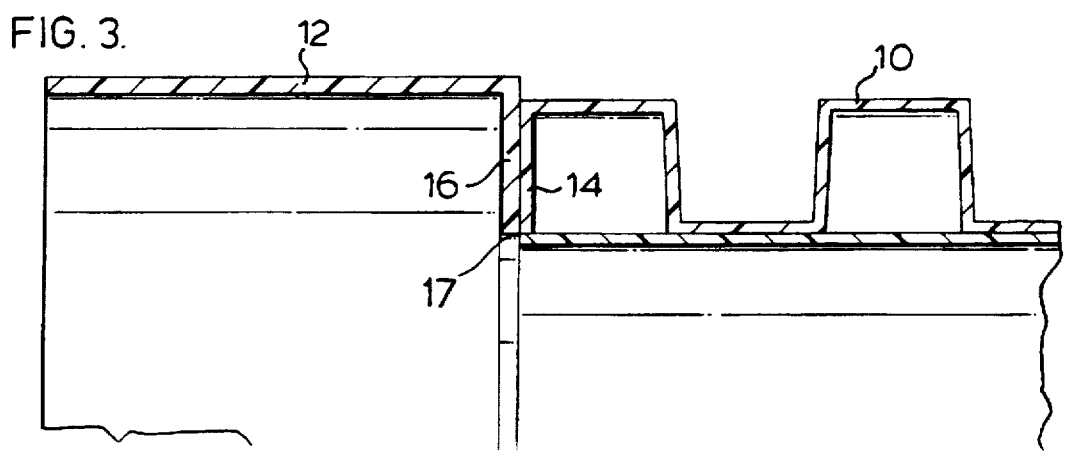
FIG. 3 is a fragmentary cross section view of a pipe and bell after assembly.
Figure 4:
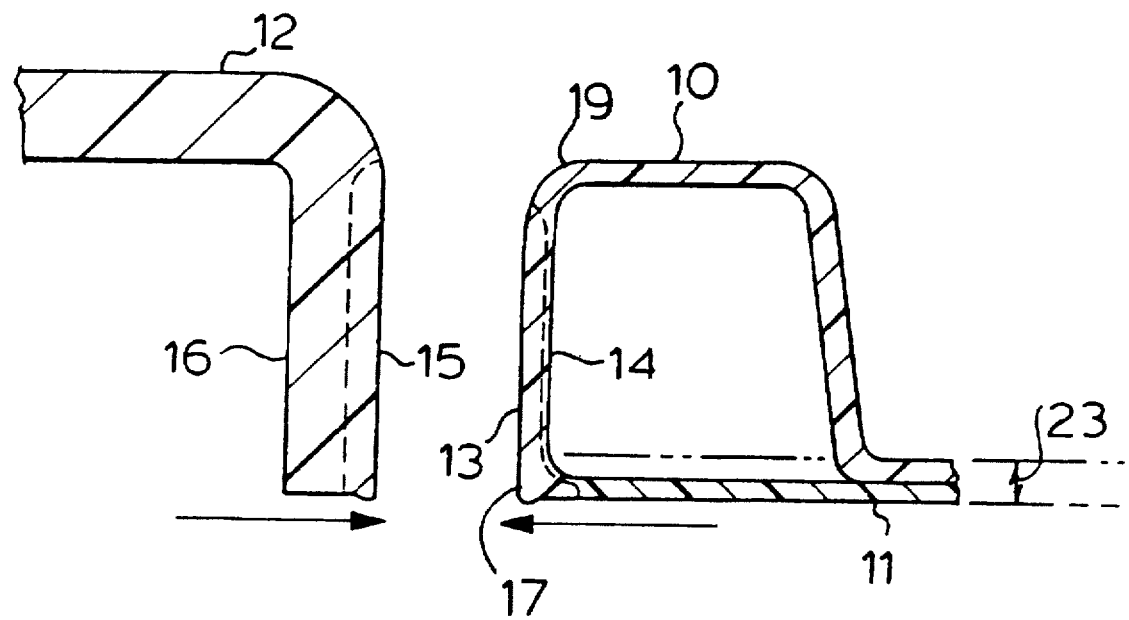
FIG. 4 is an enlarged cross-section view of a portion of FIG. 2 showing preferred zones of melting immediately prior to fuse welding.
Figure 5:
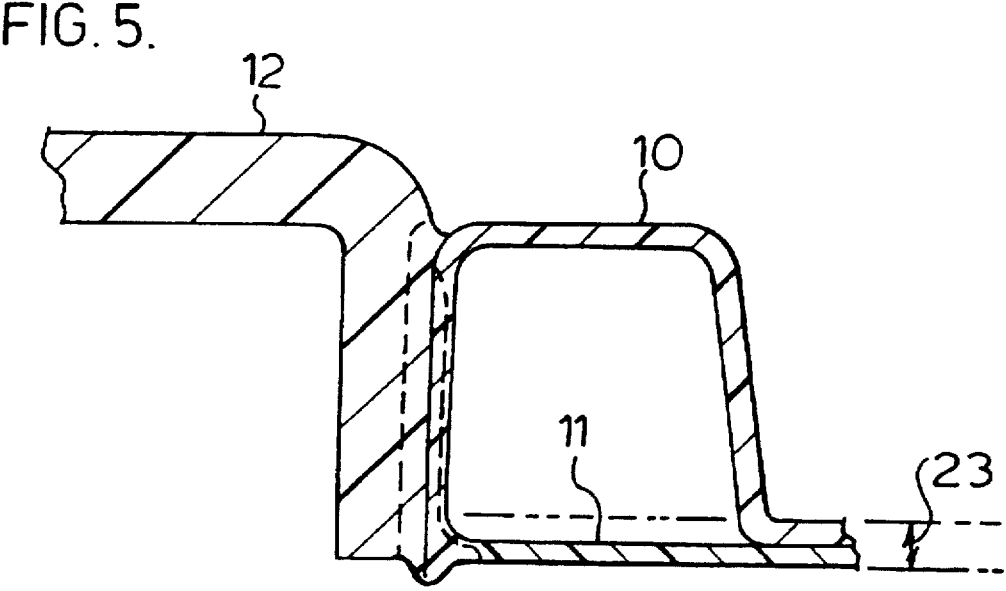
FIG. 5 is an enlarged cross-section view of the a portion of FIG. 3 after fuse welding.

With reference first to FIGS. 1 and 2, a corrugated thermoplastic pipe 10 having a smooth-wall liner is shown spaced from a compatible thermoplastic, preformed bell 12 preparatory to fuse welding together, as indicated in FIGS. 3–5.

Articles made from polyolefins such as polyethylene and polypropylene are difficult to handle and to join together when heated to their fusion temperatures since the plastics materials when heated become limp due to their poor thermal stability and tend to lose their shape. It is important therefore to heat only the portions of the pipe and bell to be fuse welded to the desired temperature prior to the welding operation and to apply the correct pressure to join the parts together. If the pipe or bell is overheated or incorrectly heated, it will collapse. If the pipe or bell is underheated, cold fusion will occur and a weak, brittle weld will be created which will crack under impact loading. It is desired for example, for polyethylene, to achieve a temperature of about 233° C. over the surfaces to be fuse welded.

Turning now to FIG. 4, the proper zone of melting is shown in which at least the dual wall thickness 23 and preferably three-quarters of the height of face 13 of pipe flange 14 (corrugation side wall) is heated and face 15 of flange 16 is heated to a height at least equal to the dual wall thickness 23 and preferably the height of pipe flange 14. The juncture 17 of flange 14 and the end of liner 11 is also heated, care being taken not to heat the top wall 19 of the corrugation beyond flange 14 to avoid collapse of the pipe corrugation during fuse welding.

The heated pipe 10 and bell 12 are moved together while opposing faces 13, 15 remain molten and pressed together under a desired pressure sufficient to displace molten plastic from the bottom of the weld, as depicted in FIG. 5 and to be described in more detail as the description proceeds.

With reference now to FIGS. 6–9, the method of operation of the apparatus of the invention will be described to provide a perspective of the function of the apparatus. A preformed bell or collar 12 to be attached to thermoplastic pipe 10 is mounted on radially expandable mandrel 26 having a longitudinal central axis 36. Preformed bell 12 has a substantially cylindrical configuration with an inwardly facing circumferential annular flange 16 formed at one end perpendicular to and concentric with the longitudinal axis 36. A thermoplastic pipe 10 to receive said preformed bell 12 at one end is secured on a support table depicted by numeral 28, co-axial with said bell 12, by a pipe holder 30 and a U-shaped pipe support 32. A rotary cutter 34 is shown in FIG. 6 co-axial with and perpendicular to the pipe end requiring the bell joint 12.

The support table 28 having the pipe 10 secured thereon is shown in FIG. 6 advancing toward the rotating cutter 34 to trim the end of the pipe 10 so as to provide an inwardly facing circumferential annular flange 14 matching flange 16 of the bell 12, as shown in FIGS. 2–5 and 9. After completion of the trimming procedure, the pipe 10 is retracted on support table 28 and the rotary cutter 34 is pivoted upwardly out of the way of the pipe.

Figure 8:
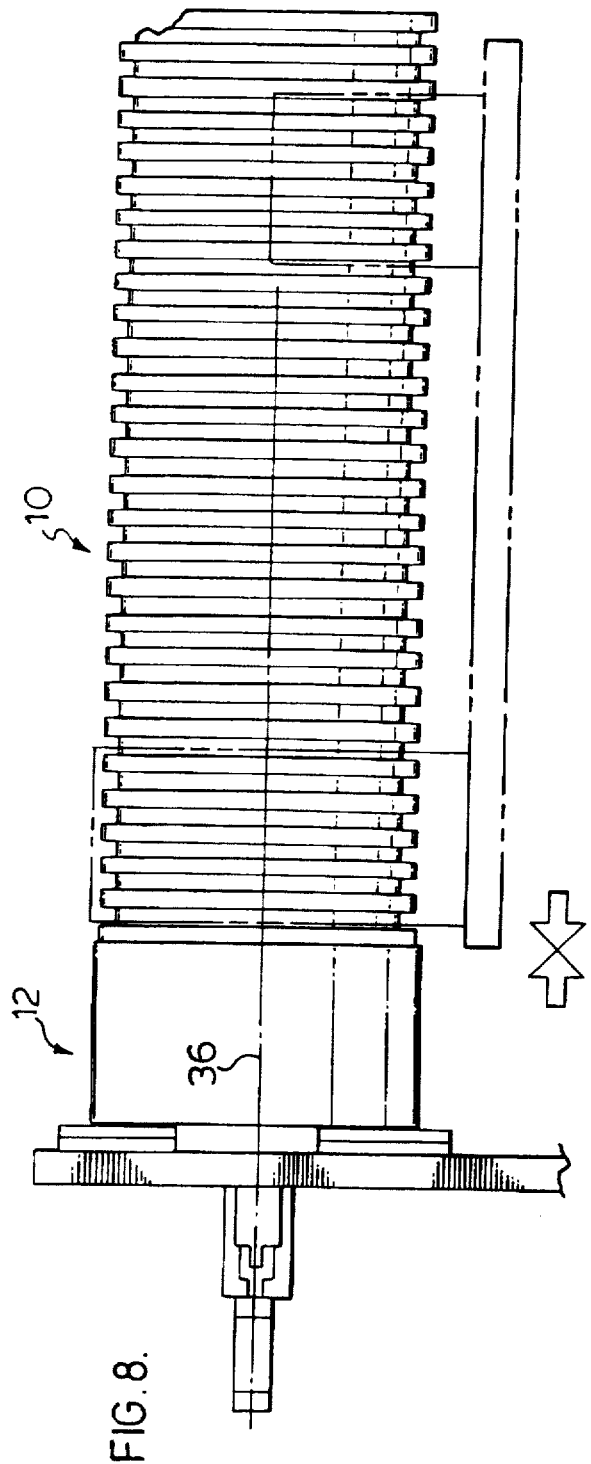
FIG. 8 is a side elevation, partly diagrammatic, of the pipe and bell being fused together.

FIG. 7 shows heater 38 having hot opposite surfaces 39, 41 positioned between and co-axial with the ends of pipe 10 and bell 12. The pipe 10 and bell 12 are shown having already been advanced axially toward the heater 38 such that the faces 13 and 15 of the opposing flanges 14, 16 of said pipe 10 and bell 12 contact the hot surfaces of the heater 38. Upon reaching the desired fusing temperature, the pipe 10 and bell 12 are axially retracted and the heater 38 is pivoted upwardly out of the way. The pipe 10 and bell 12 are then quickly brought together to abut opposing annular flanges 14, 16 of said pipe 10 and bell 12 under pressure, as shown in FIGS. 3, 5 and 8.

Figure 9:
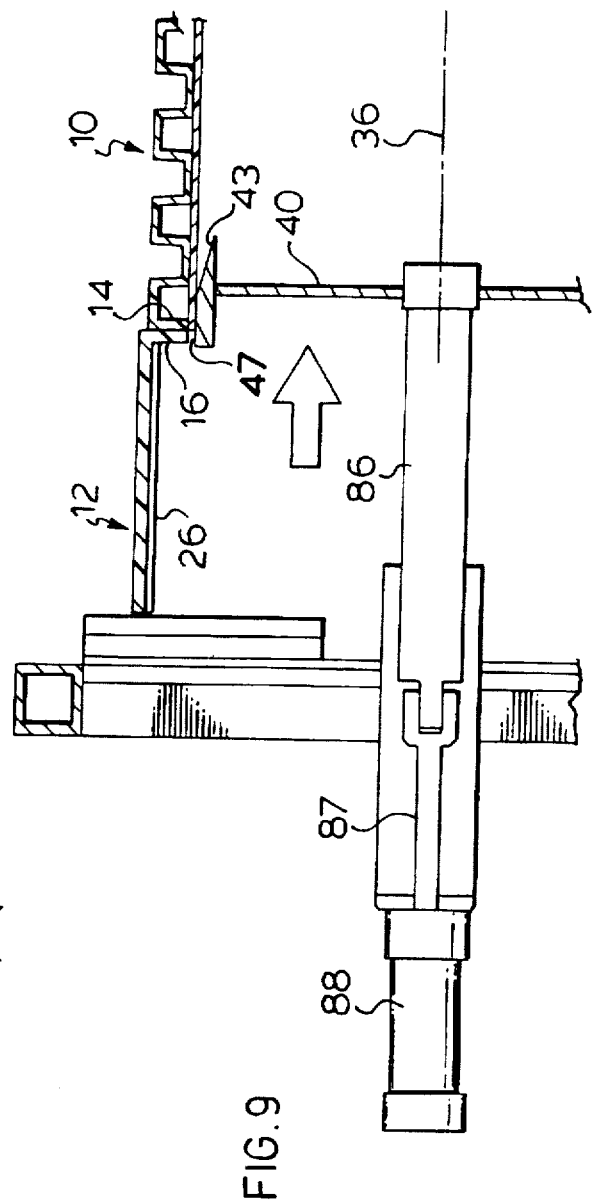
FIG. 9 is an enlarged sectional view of the bell support showing assembly of the pipe and bell with alignment means.

With reference now to FIG. 9, an aligning guide 40 is shown in more detail in the extended position to align the opposed flanges 14, 16 of pipe 10 and bell 12 respectively as the heated flanges solidify and the bell 12 becomes permanently attached to the pipe 10.

Figure 10:
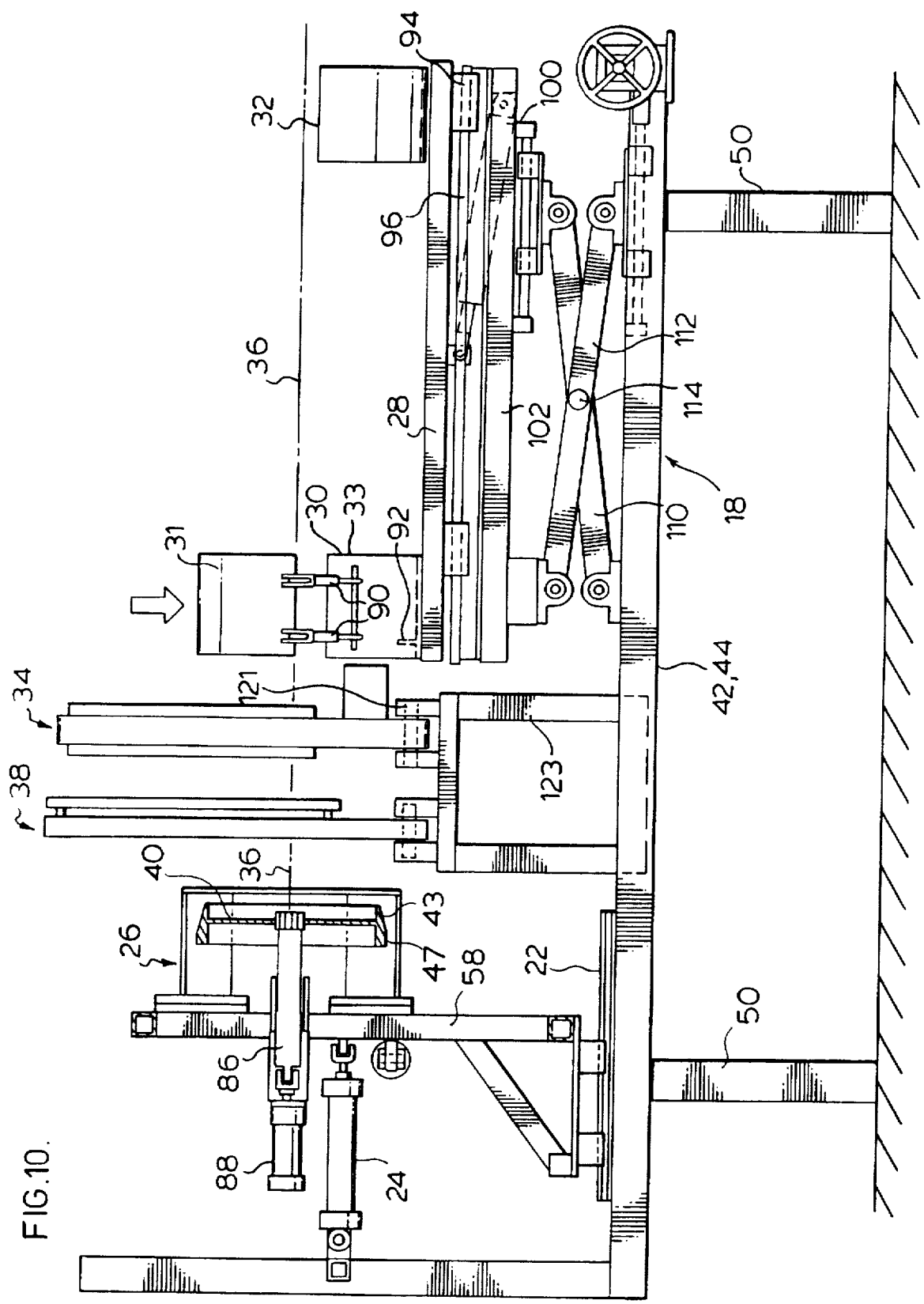
FIG. 10 is a side elevation view of the apparatus of the invention.

Turning now to FIGS. 10–14, an embodiment of the apparatus of the invention will now be described in more detail. Turning first to FIGS. 10 and 14, the supporting framework 18 comprises a pair of longitudinal side members 42, 44 extending the length of the apparatus and a series of transverse members 46, 48, two of which are shown in FIG. 14, secured together by weldments or bolts. The structure is elevated at a predetermined height above the ground by a set of vertical legs 50 affixed to said longitudinal side members 42, 44.

Figure 11:
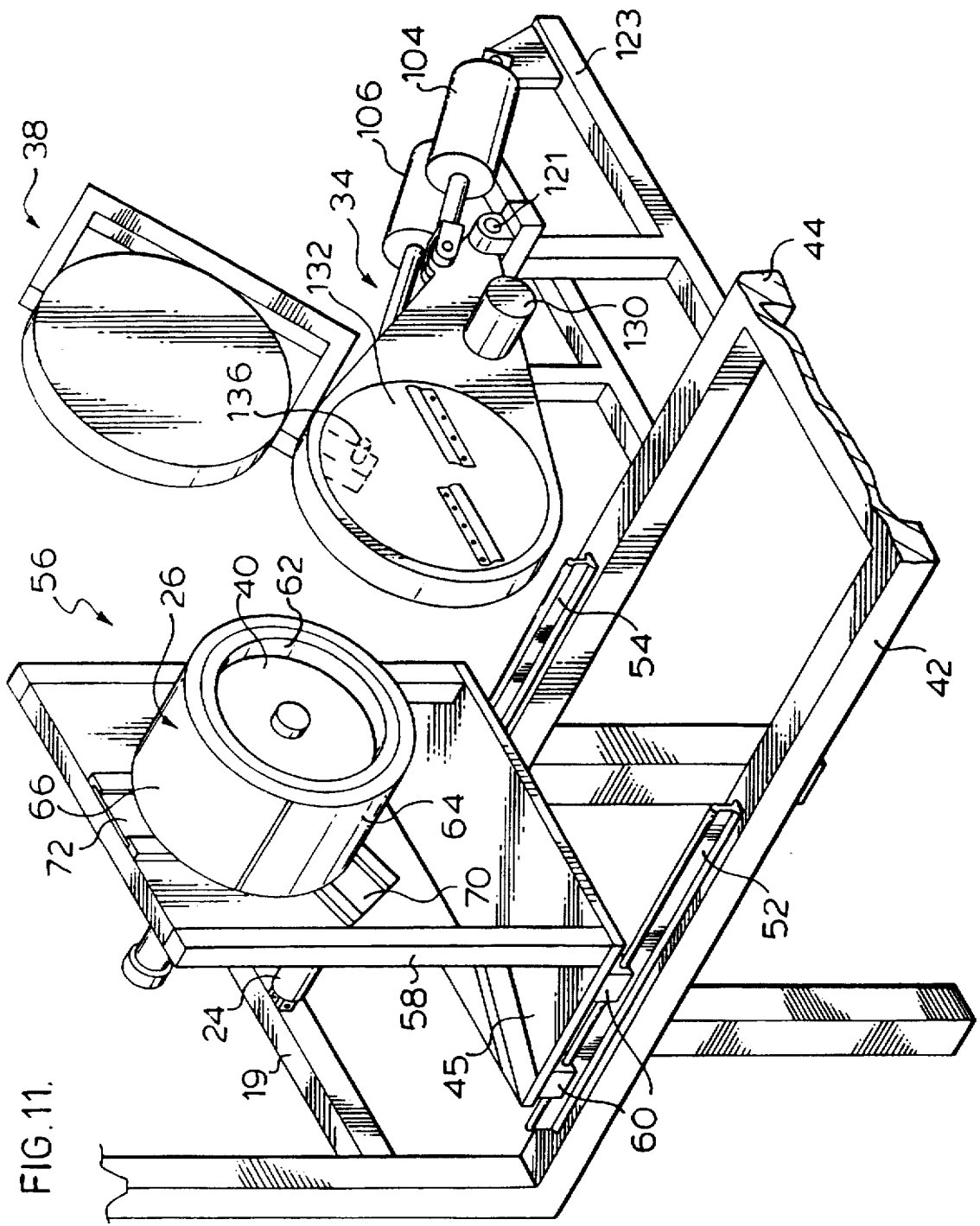
FIG. 11 is a perspective view of the bell support and an embodiment of pivotally-mounted heating and cutting means.

Turning now to FIG. 11, a pair of linear bearing rails 52, 54 are mounted at one end of the support frame on longitudinal members 42, 44 to support and to allow longitudinal reciprocal movement of bell support means 56.

Bell support means 56 comprises a mandrel frame 58 extending upwardly, perpendicular to the support frame longitudinal members 42, 44 on reciprocally-mounted base 45. Spaced slider blocks 60 secured to the underside of base 45 are in communication with linear bearing rails 52, 54, allowing mandrel frame 58 to slide freely thereon. Controlled reciprocal movement along said linear bearings 52, 54 for heating and fuse connecting operations is effected by a pneumatic cylinder 24, attached to transverse member 19 fastened to the support frame 18 at one end and to the mandrel frame 58 at the other. Although pneumatic cylinders are described herein to achieve reciprocal linear motion, it will be understood that hydraulic or other motion devices may be employed accordingly to effect linear motion of the mandrel frame and other components as will be described hereinafter.

Figure 12:
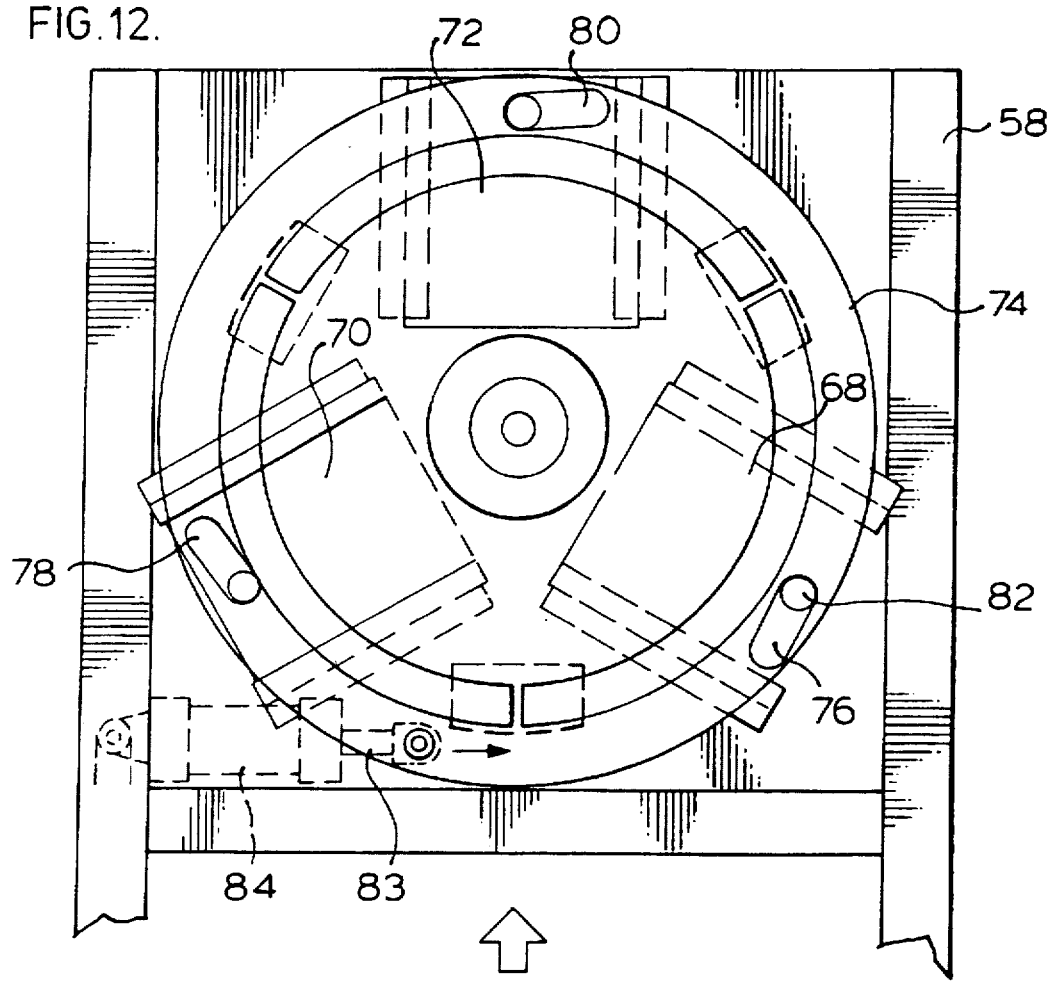
FIG. 12 is a rear end view of the bell support means.
Figure 13:
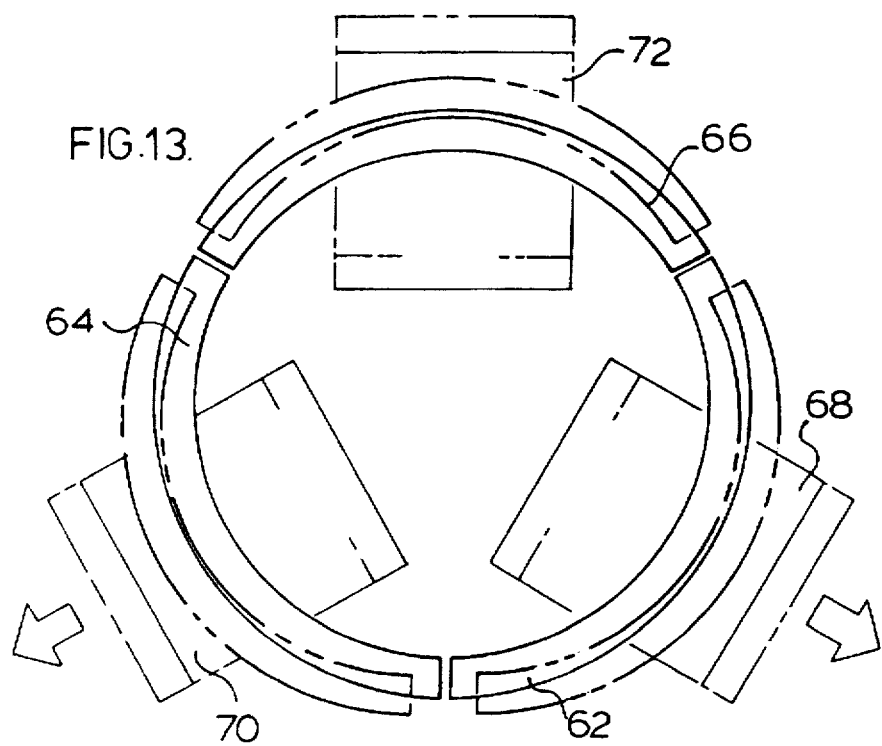
FIG. 13 is a schematic diagrammatic view corresponding to FIG. 12 showing the expanding mandrel of the bell support means.

An expandable cylindrical mandrel 26 is provided on the mandrel frame 58 having the longitudinal axis 36 parallel to the longitudinal axis of the support frame 18, (FIG. 10), for gripping and mounting a preformed bell. With particular reference to FIGS. 11–13, the cylindrical mandrel 26 is comprised of three radially contractible and expansible segment or sections 62, 64, 66 disposed at 120° to each other. Each of said sections 62, 64, 66 is secured to three sliders 68, 70, 72 respectively mounted for radial inward and outward travel on the mandrel frame 58. A ring 74 rotatably mounted on the backside of the mandrel frame 58 is provided with three divergent slots 76, 78, 80 formed 120° thereabout wherein a cam 82 depending from the rear of each of section 62, 64, 66 engages a respective slot of said rotatable ring 74. In operation, the extension of piston 83, of stationary pneumatic cylinder 84, connected tangentially to the ring 74, partially rotates said ring 74 for outward radial movement of cams 82 in slots 76, 78 and 90 for outward radial expansion of mandrel sections 62, 64, 66 operatively connected thereto, as shown most clearly in FIG. 13. A bell or collar 12 mounted thereon is thus securely gripped and held in place concentric with longitudinal axis 36.

With reference to FIG. 9, an aligning guide 40, supporting a conical frustum having a short cylindrical section 47, is positioned within the cylindrical mandrel 26 on a cylindrical slider 86 co-axial with the longitudinal axis 36 of the mandrel 26. In the retracted position, the guide 40 is completely withdrawn within the mandrel cylinder 26, narrow end facing outward (FIG. 11). Upon axially extending the guide 40, the outwardly diverging conical surface 43 of the conical frustum of said guide 40 contacts the co-extensive inner edge of inwardly facing flange 16 of the bell 12 and liner 11 of pipe 10 during abutment of pipe 10 with bell 12 to axially align said bell 12 and pipe 10. Stationary pneumatic cylinder 88 operatively connected to said cylindrical slider 86 by piston 87 provides reciprocal axial movement (FIG. 9). In a preferred embodiment, the mandrel 26 and guide 40 may be exchanged with similar components of differing size to accommodate various size bells.

Referring again to FIG. 10, pipe support table 28 is disposed above the end of the support frame 18 opposite the mandrel frame 58. Support table 28 has mounted thereon cylindrical pipe holder 30 and U-shaped pipe support 32 at opposite ends thereof to support pipe co-axial with said mandrel longitudinal axis 36. Pipe holder 30 has a hinged metal or flexible plastic top 31 pivotally mounted for insertion and removal of plastic pipe 10 and a pair of clamps 90 to secure said top 31 around the pipe 10 to base 33 in order to hold said pipe firmly in place. An internal locator and stopper 92 formed of an arcuate strip of metal fastened circumferentially about the inside surface of the base 33 of the pipe holder 30 engages a corrugation valley of the pipe to prevent axial movement of the pipe 10 when secured in said pipe holder.

In the preferred embodiment, the pipe holder 30 and pipe support 32 may be removed and easily exchanged with comparable holders and supports of varying size to accommodate a full range of pipe diameters.

To permit longitudinal axial travel of the pipe 10 for trimming, heating and subsequent connecting to the bell 12, the support table 28 has a set of slider blocks 94 depending from its undersurface adapted for longitudinal linear reciprocal travel on a pair of linear rails 96, 98 mounted on a scissor table 102. A pneumatic piston-cylinder assembly 100 pivotally secured to the underside of the support table 28 at one end and to the top of scissor table 102 at the other end, provides reciprocal linear motion to the support table 28.

The scissor table 102 is mounted on the support frame 18 by a pair of scissor links 110, 112, one pair of which being shown, pivotally interconnected by pin 114. Each of links 110 is pivoted at its lower end to stationary cross member 48 and each of links 112 is pivoted at its lower end to plate 116, the upper ends of links 110, 112 being pivotally secured to table 102. Longitudinal movement of plate 116 by rotation of screw 120 by actuation of wheel 122 allows vertical positioning of the support table 28 to accommodate various pipe diameters. As the pipe diameter is decreased, the support table 28 must be raised to ensure axial alignment of the pipe 10 and bell 12.

Rotary pipe trimmer 34 for facing the end of a pipe 10 requiring a bell joint may be provided perpendicular to the pipe axis, as illustrated in FIGS. 10 and 11. The pipe trimmer 34 is pivotally connected at 121 to a support frame 123 attached to longitudinal member 44 of the support frame 18, whereby actuation of pneumatic piston-cylinder 104 will move the trimmer 34 into or out of the axis of the pipe 10. Electric motor 130 drives rotary cutting head 132 when pipe trimmer 34 is in its operative position. It may be desired to trim pipe manually with a router, in which case trimmer 34 would not be actuated.

Heating means 38 is pivotally connected at 136 to frame 123 whereby actuation of pneumatic piston-cylinder 106 will move the heating means 38 into or out of the axis 36. In operation, opposite faces of the heater are heated up to the temperature of the melting point of the thermoplastic material. The opposed faces 13, 15 of flanges 14, 16 of the pipe 10 and bell 12 abutting the heater faces thus are heated to the thermoplastic melting point, the heating means 38 retracted, and faces 13, 15 quickly abutted under pressure to form an integral joint, as has been described.

Although heating means 38 are shown pivotally mounted, heating means 38 can be mounted for horizontal or vertical linear travel in a guideway.

FIG. 15 illustrates another embodiment of the invention in which a corrugation of pipe 200 is severed near the crown 202 of the corrugation to leave upstanding sidewall 204 and inner stub 205 to form a pipe flange, the inner face 206 of sidewall 204 being exposed. A 360° backing ring 208 inserted in the valley 210 between the last complete corrugation 212 and sidewall flange 204 provides lateral support to flange 204 as shown in FIG. 16 when bell flange 212 of bell 213 is abutted against flange 204 during fuse welding.

This embodiment reduces the possibility of sidewall collapse when under pressure during fuse welding and accidental cutting of holes in the liner of the pipe during removal of flash weld, while strengthening the resulting weld (FIG. 16) by joining bell flange 212 to both the corrugation flange 204 and liner material 214.

FIGS. 17 and 18 illustrate an embodiment of the apparatus of the invention in which backing ring 208 is divided into two 180° components 208a and 208b supported by semicircular holders 220, 222 respectively. Holders 220, 222 are pivotally mounted on shafts 224, 226 for retraction by piston-cylinder assemblies 228, 230 to the open position depicted in FIG. 18 and for extension to the closed position depicted by ghost lines.

Corrugated pipe 200 is locked by backing ring 208 and, with reference also to FIGS. 15–17, by semi-circular ring support plates 240 which interconnect holders 220, 222 to the respective backing rings.

A second pair of holders 242 pivotally mounted on shafts 224, 226 is spaced axially from holders 220, 222 and actuated therewith to provide additional support to pipe 200.

The backing ring assembly would be substituted for pipe holder 30 shown in FIGS. 10 and 14 and described above. The invention also includes an apparatus for producing a bell joint on an end of a thermoplastic corrugated pipe having a circumferential single wall flange comprising, in combination:

a supporting framework;

bell support means for supporting a bell having a circumferential flange and a having a longitudinal axis disposed at an end of said supporting framework for internally gripping and supporting the bell concentric with said longitudinal axis, said bell support means comprising a mandrel frame mounted on the supporting framework for reciprocal linear travel and an expandable cylindrical mandrel mounted on the mandrel frame, said expandable cylindrical mandrel having a plurality of radially contractible or expansible segments;

piston and cylinder means connected to the supporting framework and to the mandrel frame for moving said mandrel frame linearly on the supporting framework;

means for symmetrically contracting or expanding said mandrel segments about the bell support means longitudinal axis;

pipe support means disposed at another end of the supporting framework for externally gripping and supporting the corrugated pipe;

means for raising and lowering one of said pipe support means or bell support means on said supporting framework for aligning the bell on the bell support means and the pipe in the pipe support means co-axial with said longitudinal axis; means for moving said pipe support means axially towards and away from said bell support means;

a heating means for heating opposed faces of the single wall flange of the end of the pipe and the circumferential flange of the bell, wherein said face of the pipe has a back surface, to a desired melting temperature upon movement of the bell support means and the pipe support means;

whereby upon heating of the opposed faces of the bell and the pipe to a desired melting temperature the bell support means and the pipe support means can be moved to permit withdrawal of the heating means, and said faces of the bell and the pipe can be abutted against each other, with the back surface of said face of the pipe being supported by a backing plate means, at a desired pressure by concurrent movement of at least one of the bell support means and the pipe support means for a time sufficient to fuse the bell and pipe together and said backing plate means being for supporting the back surface of the face of the pipe during heating and fusing, wherein said backing plate means comprises two segments each disposed at about 180° about said mandrel; and piston and cylinder means for positioning said segments in an open loading position and a closed operative position connecting said segments to the mandrel frame.

It will be understood, of course, that modifications can be made in the embodiment of the invention illustrated and described herein without departing from the scope and purview of the invention as defined by the appended claims.

We claim:

1. In an apparatus for producing a bell joint on an end of a thermoplastic corrugated pipe having a circumferential single wall flange and in combination having a supporting framework;

bell support means for supporting a bell having a circumferential flange and having a longitudinal axis disposed at an end of said supporting framework;

said bell support means comprising a mandrel frame mounted on the supporting framework for reciprocal linear travel and a mandrel mounted on the mandrel frame; means for moving said mandrel frame on the supporting framework;

pipe support means disposed at another end of the supporting framework for supporting the corrugated pipe; means for aligning the bell and the pipe co-axial with said longitudinal axis;

means for moving said pipe support means axially towards and away from said bell support means;

a heating means for heating opposed faces of the bell flange and pipe flange;

whereby upon heating of the opposed faces of the bell flange and the pipe flange to a desired melting temperature the bell support means and the pipe support means can be moved to permit withdrawal of the heating means, and said faces of the bell flange and the pipe flange, wherein said face of the single wall pipe flange has a back surface, can be abutted against each other at a desired pressure by concurrent movement of at least one of the bell support means and the pipe support means for a time sufficient to fuse the bell and pipe together, the improvement comprising backing plate means for supporting the back surface of the face of the single wall pipe flange during heating and fusing including a first backing plate segment and a second backing plate segment and the pipe support means comprises a first holder pivotally mounted on a shaft and a second holder pivotally mounted on a shaft, the first backing plate segment connected to the first holder, and the second backing plate segment connected to the second holder, said backing plate segments having a retracted loading position, and a closed operative position, and piston and cylinder means connected to each of said first holder and said second holder for moving said backing plate segments between said retracted loading and closed operative positions.

2. An apparatus for producing a bell joint on an end of a thermoplastic corrugated pipe having a circumferential single wall flange comprising, in combination:

a supporting framework;

bell support means for supporting a bell having a circumferential flange and a having a longitudinal axis disposed at an end of said supporting framework for internally gripping and supporting the bell concentric with said longitudinal axis, said bell support means comprising a mandrel frame mounted on the supporting framework for reciprocal linear travel and an expandable cylindrical mandrel mounted on the mandrel frame, said expandable cylindrical mandrel having a plurality of radially contractible or expansible segments;

piston and cylinder means connected to the supporting framework and to the mandrel frame for moving said mandrel frame linearly on the supporting framework;

means for symmetrically contracting or expanding said mandrel segments about the bell support means longitudinal axis;

pipe support means disposed at another end of the supporting framework for externally gripping and supporting the corrugated pipe;

means for raising and lowering one of said pipe support means or bell support means on said supporting framework for aligning the bell on the bell support means and the pipe in the pipe support means co-axial with said longitudinal axis;

means for moving said pipe support means axially towards and away from said bell support means;

a heating means for heating opposed faces of the single wall flange of the end of the pipe and the circumferential flange of the bell, wherein said face of the pipe has a back surface, to a desired melting temperature upon movement of the bell support means and the pipe support means;

whereby upon heating of the opposed faces of the bell and the pipe to a desired melting temperature the bell support means and the pipe support means can be moved to permit withdrawal of the heating means, and said faces of the bell and the pipe can be abutted against each other, with the back surface of said face of the pipe being supported by a backing plate means, at a desired pressure by concurrent movement of at least one of the bell support means and the pipe support means for a time sufficient to fuse the bell and pipe together and said backing plate means being for supporting the back surface of the face of the pipe during heating and fusing, wherein said backing plate means comprises two segments each disposed at about 180° about said mandrel; and piston and cylinder means for positioning said segments in an open loading position and a closed operative position connecting said segments to the mandrel frame.

3. A method for producing a bell joint on an end of thermoplastic polyolefin corrugated pipe having corrugations on a liner, each corrugation having a pair of spaced-apart sidewalls joined by a crown comprising the steps:

supporting a thermoplastic polyolefin bell having an inwardly facing circumferential flange with bell support means having a longitudinal axis disposed at an end of a supporting framework, gripping and supporting the thermoplastic polyolefin corrugated pipe with pipe support means disposed at the other end of the supporting framework; raising and lowering said pipe on said supporting framework whereby said pipe is disposed co-axial with the longitudinal axis;

trimming the end of the pipe at a corrugation near the crown to provide a single upstanding sidewall with an exposed inner face and a back surface and a liner stub for forming a pipe flange, whereby said bell flange and said pipe flange have opposed annular faces;

supporting said back surface of the pipe flange with a backing plate means; extending heating means operatively mounted on the supporting framework into and out of the longitudinal axis for heating opposed annular faces of the flange at the end of the pipe and the flange of the bell to a desired melting temperature; retracting the heating means;

and immediately abutting the opposed heated faces of the bell flange and the pipe flange against each other at a desired pressure while completely supporting the pipe flange with the backing plate means for a time sufficient to fuse the bell flange and the pipe flange together.

4. A method as claimed in claim 3 in which the thermoplastic polyolefin corrugated pipe is a thermoplastic polyolefin corrugated pipe having a liner and a dual wall thickness and in which at least the dual wall thickness of the height of the face of pipe circumferential flange is melted and the face of the bell circumferential flange is melted to a height at least equal to the height of said dual wall thickness.

5. A method as claimed in claim 4 in which the polyolefin is polyethylene and the melting temperature is about 233° C.

6. A method as claimed in claim 3 in which the polyolefin is polyethylene and the melting temperature is about 233° C.

* * * * *